(12) United States Patent
Correia et al.

(10) Patent No.: US 10,590,781 B2
(45) Date of Patent: Mar. 17, 2020

(54) TURBINE ENGINE ASSEMBLY WITH A COMPONENT HAVING A LEADING EDGE TROUGH

(71) Applicant: General Electric Company, Schenectady, NY (US)

(72) Inventors: Victor Hugo Silva Correia, Milton Mills, NH (US); Robert Francis Manning, Newburyport, MA (US); George Joe-Kueng Chan, Salem, MA (US); James Earl Kopriva, Wichester, MA (US)

(73) Assignee: General Electric Company, Schenectady, NY (US)

( * ) Notice: Subject to any disclaimer, the term of this patent is extended or adjusted under 35 U.S.C. 154(b) by 334 days.

(21) Appl. No.: 15/386,000

(22) Filed: Dec. 21, 2016

(65) Prior Publication Data

US 2018/0171808 A1 Jun. 21, 2018

(51) Int. Cl.
| | | |
|---|---|---|
| *F01D 9/04* | (2006.01) | |
| *F01D 5/14* | (2006.01) | |
| *F01D 9/02* | (2006.01) | |
| *F01D 17/02* | (2006.01) | |
| *F01D 25/16* | (2006.01) | |

(52) U.S. Cl.
CPC ............. *F01D 9/041* (2013.01); *F01D 5/143* (2013.01); *F01D 9/023* (2013.01); *F01D 17/02* (2013.01); *F01D 25/162* (2013.01); *F05D 2240/121* (2013.01); *F05D 2240/127* (2013.01)

(58) Field of Classification Search
CPC .......... F01D 9/041; F01D 5/143; F01D 9/023; F01D 25/162; F01D 17/02; F01D 5/145; F05D 2240/127; F05D 2240/121
See application file for complete search history.

(56) References Cited

U.S. PATENT DOCUMENTS

| | | | | |
|---|---|---|---|---|
| 5,517,865 | A * | 5/1996 | Wisler | B64C 21/00 181/215 |
| 6,213,711 | B1 * | 4/2001 | Muller | F01D 5/145 415/191 |
| 6,230,103 | B1 * | 5/2001 | DeCorso | G01N 33/004 60/39.27 |
| 6,561,761 | B1 * | 5/2003 | Decker | F04D 29/681 415/173.1 |
| 6,719,529 | B2 * | 4/2004 | Tiemann | F01D 5/186 415/115 |
| 7,597,536 | B1 * | 10/2009 | Liang | F01D 5/147 415/115 |
| 7,841,828 | B2 * | 11/2010 | Liang | F01D 5/145 415/191 |
| 7,887,297 | B2 | 2/2011 | Allen-Bradley et al. | |
| 8,342,803 | B2 * | 1/2013 | Grohens | F01D 5/143 415/115 |
| 8,398,364 | B1 * | 3/2013 | Liang | F01D 5/145 415/115 |
| 8,403,645 | B2 | 3/2013 | Barnes et al. | |
| 8,459,956 | B2 | 6/2013 | Pandey et al. | |

(Continued)

*Primary Examiner* — David Hamaoui
(74) *Attorney, Agent, or Firm* — McGarry Bair PC

(57) ABSTRACT

An assembly for a turbine engine comprises a circumferential band defining an air flow path, a component having a leading edge and extending from the band into the flow path, and a trough located in a surface of the band along the leading edge.

24 Claims, 5 Drawing Sheets

(56) References Cited

U.S. PATENT DOCUMENTS

| | | |
|---|---|---|
| 8,668,454 B2 * | 3/2014 | Wiebe ................... F01D 5/18 |
| | | 416/97 R |
| 8,727,725 B1 | 5/2014 | Liang |
| 8,807,930 B2 | 8/2014 | Green et al. |
| 9,103,213 B2 | 8/2015 | Barr et al. |
| 9,376,927 B2 | 6/2016 | Stein et al. |
| 2008/0050223 A1 | 2/2008 | Liang |
| 2013/0017095 A1 * | 1/2013 | Lee ..................... F01D 5/081 |
| | | 416/239 |
| 2013/0224027 A1 | 8/2013 | Barr |
| 2016/0003060 A1 * | 1/2016 | Cook .................... F01D 5/28 |
| | | 416/224 |
| 2016/0130968 A1 | 5/2016 | Aggarwala et al. |

* cited by examiner

TURBINE ENGINE ASSEMBLY WITH A COMPONENT HAVING A LEADING EDGE TROUGH

BACKGROUND OF THE INVENTION

Turbine engines, and particularly gas or combustion turbine engines, are rotary engines that extract energy from a flow of combusted gases passing into the engine through a series of compressor stages, a combustor, and a series of turbine stages where each compressor stage and turbine stage includes a multitude of rotating blades and stationary vanes. Turbine engines are commonly used for aeronautical applications such as propulsion of aircraft, and also for terrestrial applications such as power generation.

Turbine engines for aircraft utilize mainstream flow to drive the rotating turbine blades to generate thrust. The mainstream flow is propelled by combustion of gas to increase the thrust generated by the engine, the mainstream flow can create a bow wave in front of the turbine airfoils.

Turbine engines for aircraft are designed to operate at high temperatures to maximize engine efficiency. Temperatures in the high pressure turbine can be around 1000° -2000° C., and the spacing between each vane and blade in a stage can be constructed to prevent ingestion of the bow wave into regions that are sensitive to high temperatures.

BRIEF DESCRIPTION OF THE INVENTION

In one aspect, an assembly for a turbine engine comprises radially spaced inner and outer bands that define a flow path between the bands, where the inner and outer bands each have an upstream edge, a downstream edge, and a surface extending between the upstream and downstream edges. The assembly further comprises a component extending from at least one of the inner and outer bands into the flow path and defining a leading edge confronting the flow path, and also comprises a trough located in the surface of the at least one of the inner and outer bands along the leading edge.

In another aspect, a turbine assembly for a turbine engine comprises an outer band, an inner band radially spaced inwardly from the outer band and at least one of the outer and inner bands having an upstream edge and a downstream edge with a surface extending between, a vane having an outer wall extending from a leading edge to a trailing edge to define a chord-wise direction and extending from a root to a tip to define a span-wise direction, with the root proximate the surface of the platform, and a trough located in the upper surface at least along the leading edge.

In yet another aspect, a method of controlling the upstream extent of a bow wave from an airfoil in a gas turbine engine comprises forming a vortex at a leading edge of the airfoil along at least a portion of the root of the airfoil.

DESCRIPTION OF EMBODIMENTS OF THE INVENTION

Figure 1:
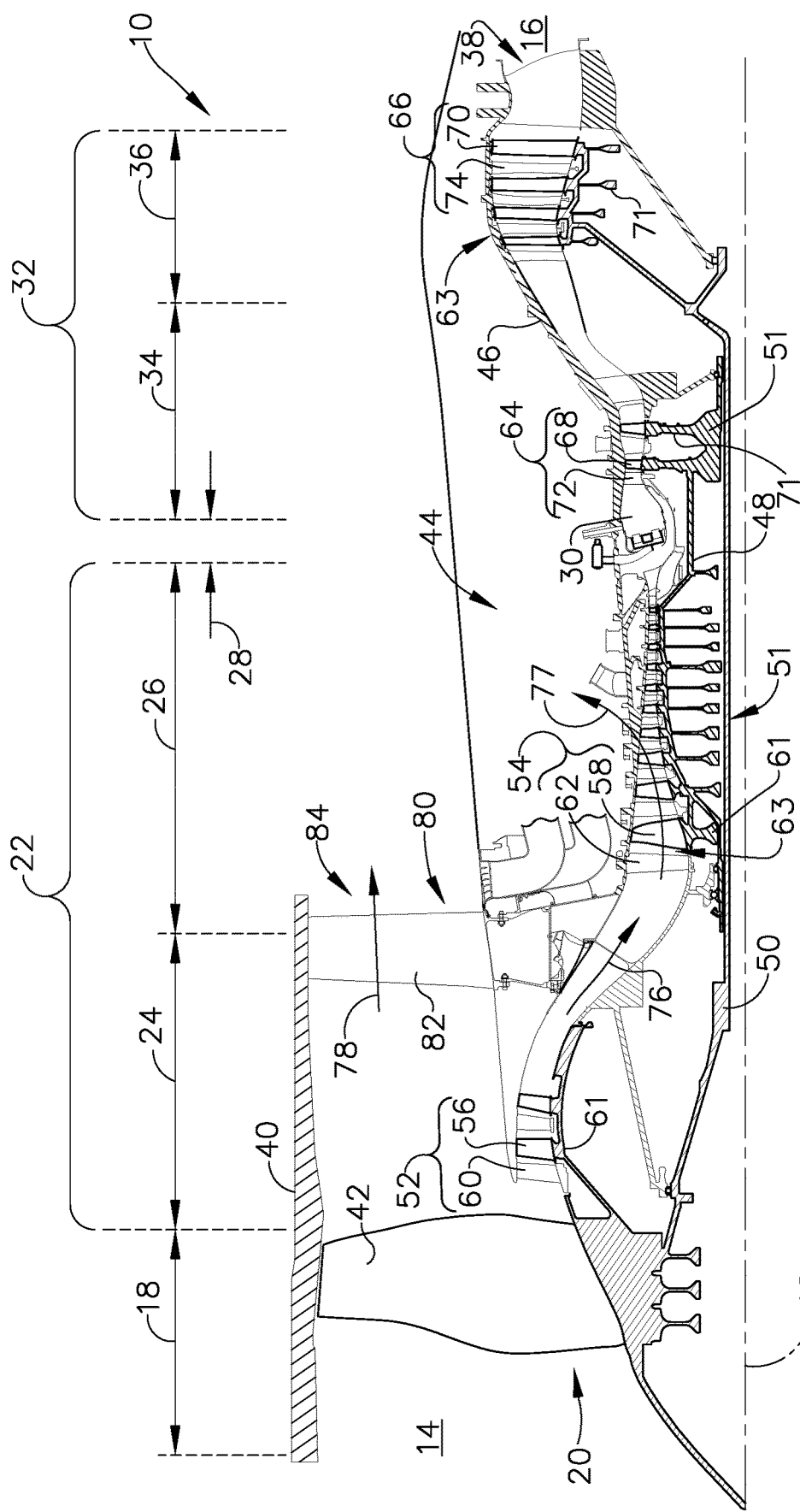
FIG. 1 is a schematic cross-sectional diagram of a gas turbine engine for an aircraft.

A gap or cavity between flow path components in a turbine engine typically contains materials that are sensitive to high temperatures, and it is beneficial to purge such cavities with cooler air. The cavity purge pressure is set by the inner or outer band static pressure in the gas flow path. These gaps are subject to pressure variations in the flow path, such as a bow wave that emanates from the lead edge of flow path obstructions such as airfoils. The bow wave generates a locally high pressure which can result in ingestion of hot gases into the cavity that contains temperature-sensitive materials.

The bow wave strength and broadcast is driven by the flow path approach velocity and airfoil lead-edge diameter. The approach velocity and lead-edge diameter are typically designed for optimal aerodynamic performance, and therefore other methods are often evaluated to reduce bow wave broadcast for a given aerodynamic design.

This invention seeks to reduce the forward broadcast of a bow wave from an airfoil lead edge or other flow path obstruction by the placement of a trough around the leading edge of the airfoil at the interface with either the inner or outer band. The trough can create a controlled vortex within the confines of the trough and suppress the bow wave in the vicinity of the trough. The suppressed bow-wave can reduce or eliminates the ingestion of hot gases into the cavities between flow path components and therefore allow the flow path axial lengths to be reduced, resulting in weight savings and lower frictional losses.

The described embodiments of the present invention are directed to a trough for an airfoil located along the leading edge of the airfoil in a turbine engine. For purposes of illustration, the present invention will be described with respect to a vane in the turbine section of an aircraft turbine engine. It will be understood, however, that the invention is not so limited and may be applied to a vane or blade located within a compressor section as well as the turbine section, and in the case of vanes can be applied to the inner or outer bands. Further, the present invention may have general applicability within an engine as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24 and fan 18, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Figure 2:
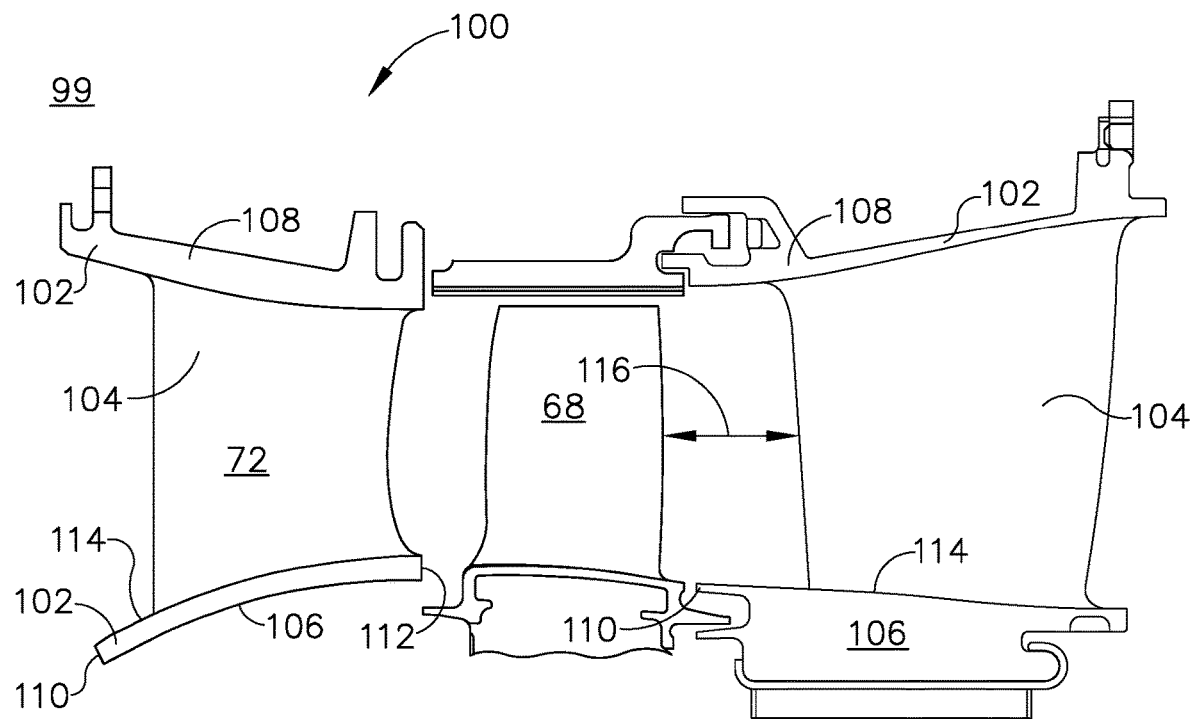
FIG. 2 is a side view of a portion of a high pressure turbine assembly of the turbine engine in FIG. 1, with the stage comprising rotating airfoils in the form of blades and stationary airfoils in the form of vanes.

A side view of a turbine assembly 99 of the turbine engine is illustrated in FIG. 2. The turbine assembly 99 comprises a circumferential band, such as an inner band 106 or outer band 108, wherein the inner band 106 is radially spaced inwardly from the outer band 108 and a flow path can be defined between the bands 106, 108. The bands 106, 108 can each have an upstream edge 110, a downstream edge 112, and a surface 114 extending between the upstream and downstream edges 110, 112. A component, illustrated herein as an airfoil 104 (for example, a blade 68 or vane 72) can extend from at least one of the inner band 106 and outer band 108 into the flow path, and can also have a leading edge that confronts the flow path. In addition, a spacing distance 116 can be constructed between each blade 68 and adjacent vane 72. It should be understood that this blade-vane pair was selected for illustrative purposes only and is not meant to be limiting.

It is further contemplated that the component may comprise a temperature probe, strut, nozzle, pyrometer, other instrumentation probe, or any other device that can extend from either or both of the bands 106, 108 and have a leading edge confronting the flow path.

Figure 3:
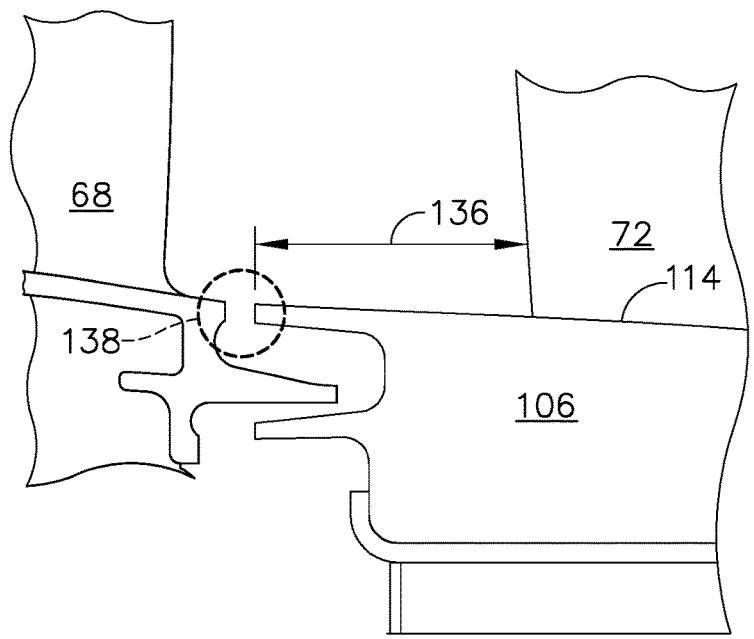
FIG. 3 is a closeup side view of the turbine assembly of FIG. 2.

FIG. 3 shows a close up view of the interface between the vane 72 and blade 68. A gap 138 can exist in this interface, and other components or materials (not shown) may be positioned within or below the gap 138.

Figure 4:
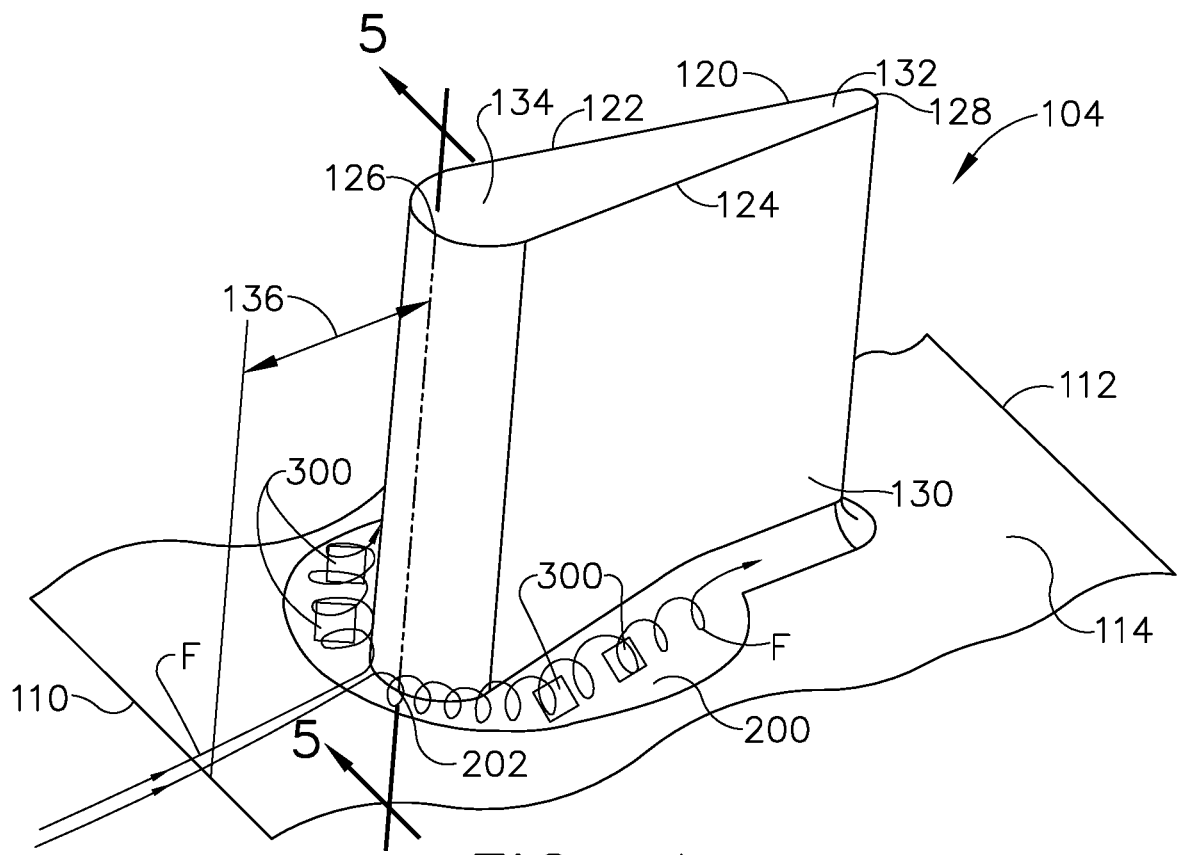
FIG. 4 is a perspective view of one of the airfoils, which has been simplified into an aerodynamic wedge of the turbine assembly in FIG. 2 according to a first embodiment of the invention.

FIG. 4 shows a perspective view of a simplified lower half of a nozzle airfoil 104 according to a first embodiment of the invention. The airfoil 104 comprises a pressure side 122 and a suction side 124. The airfoil 104 can extend from a leading edge 126 to a trailing edge 128 to define a chord-wise direction, and also extend from a root 130 to a tip 132 to define a span-wise direction where the root 130 is proximate the surface 114 of at least one of the bands 106, 108. The leading edge 126 can have an effective radius 134 and be positioned an axial distance 136 away from the upstream edge 110 of the inner band 106 wherein the distance 136 can be a function of the radius 134 of the leading edge 126. The distance 136 can be approximately between 1.0 and 5.0 times the leading edge radius 134. In addition, a trough 200 can be located in the surface 114, and can have an inner wall 202 at least along the leading edge 126 of the airfoil 104. The trough 200 can also extend around the leading edge 126 to a least a portion of the suction side 124 and the pressure side 122. Further, at least one flow enhancer 300 can be positioned within the trough 200 and can comprise at least one of a turbulator, fastback turbulator, pin fins, pin bank, vortex generator, or chevron in non-limiting examples.

Figure 5:
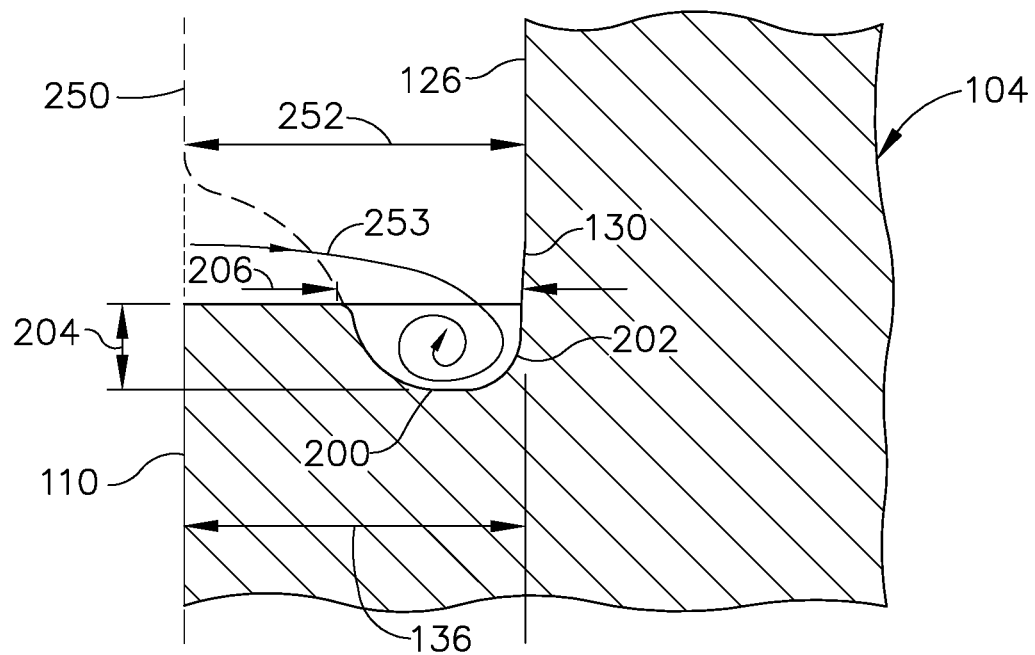
FIG. 5 is a side sectional view of a portion of the airfoil in FIG. 4 taken along line 5-5.

A side sectional view of a portion of the airfoil 104 taken along line 5-5 is illustrated in FIG. 5. At the root 130 of the leading edge 126 of the airfoil 104, the trough 200 can have a depth 204 and a width 206. Either or both of the depth 204 and width 206 can be a function of the radius 134 of the leading edge 126. For example, the depth 204 or width 206 can be at least 0.5 times the radius 134 or up to 3.0 times the radius 134, and it should be understood that this example is given for illustrative purposes and is not meant to be limiting. Further, while the trough 200 is illustrated with a constant depth 204 and width 206, it is contemplated that the trough 200 may also be contoured with tapering width 206 or depth 206 as it extends around the pressure side or suction side. In a preferred embodiment the inner wall 202 of the trough 200 can be in vertical alignment with the leading edge 126, or the inner wall could be positioned an approximate distance of 1.0 times the radius 134 upstream of the leading edge 126. Further, a high pressure combustion gas flow known as a bow wave 250 can be formed at an extent 252 upstream of the leading edge 126, and the bow wave 250 can typically extend vertically upward as shown by the straight dashed line.

Figure 6:
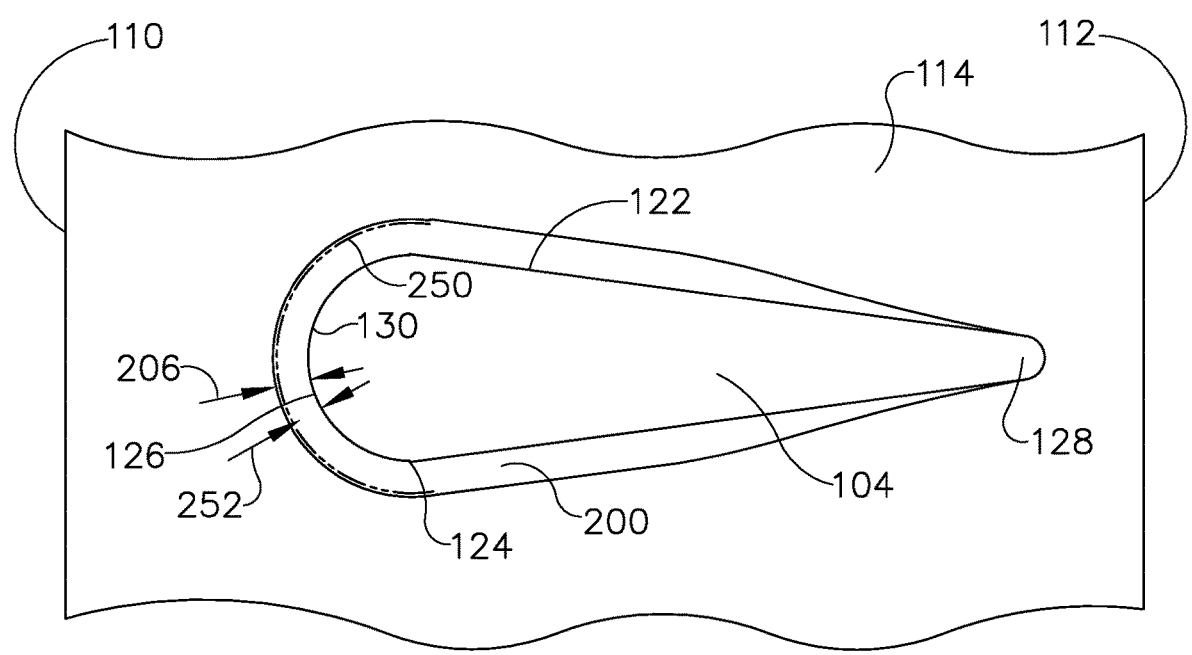
FIG. 6 is a top view of the airfoil in FIG. 4.

Turning to FIG. 6, a top view of the airfoil 104 is illustrated. The trough 200 can extend around the leading edge 126 of the airfoil 104 to at least a portion of the suction side 124 and pressure side 122.

The dimensions of the trough 200 can be chosen such that air flowing toward the leading edge 126 can move into the trough 200 and form a vortex extending about the leading edge 126 from the pressure side 122 to the suction side 124 as shown in FIG. 4. Exemplary air flow lines F are shown in FIGS. 4 and 5 for air moving near the surface 114 and forming a vortex in the trough 200. This vortex can extend up the airfoil 104 along at least a portion of the span from the root 130, and can also extend around the airfoil 104 along at least a portion of the pressure side 122 and the suction side 124. Moreover, the formation of the vortex can limit the extent 252 of the bow wave 250 at the root 130 to be smaller than or equal to the width 206 of the trough 200 as shown by the curved dashed line in FIGS. 5 and 6, and can also be smaller than or equal to the width 206 of the trough 200 at up to 15% of the span from the root 130 as shown in FIG. 5.

Figure 7:
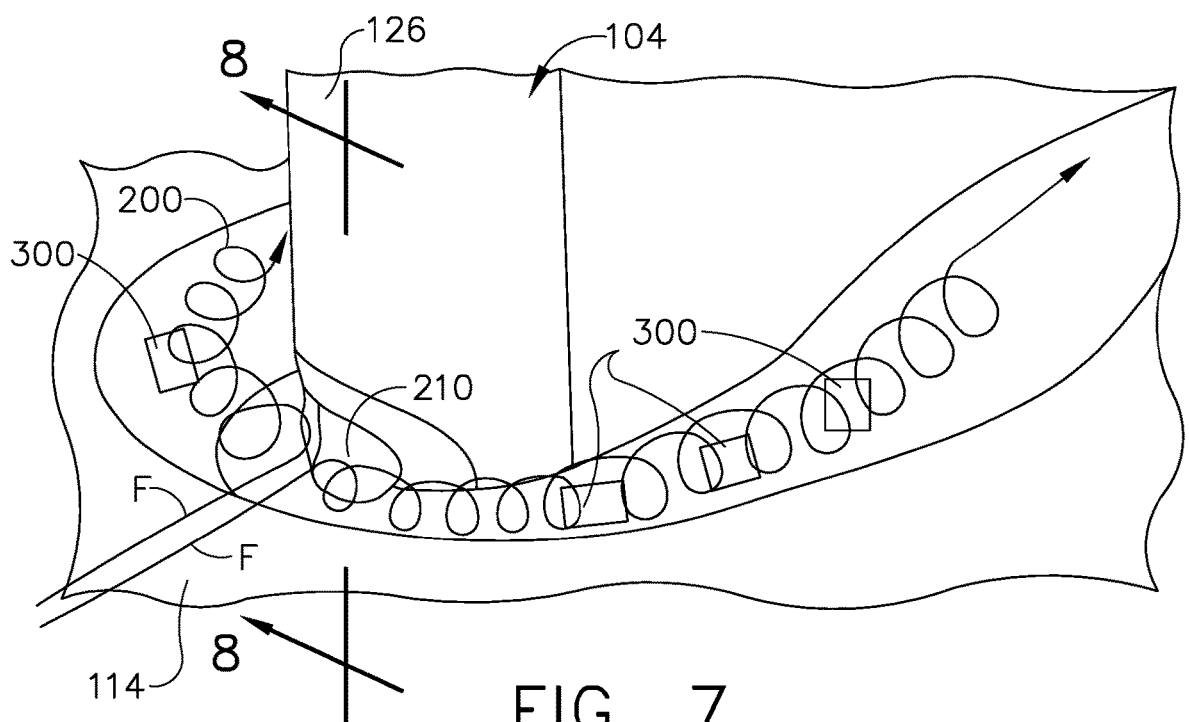
FIG. 7 is a perspective view of one of the airfoils of the turbine assembly in FIG. 2 according to a second embodiment of the invention.
Figure 8:
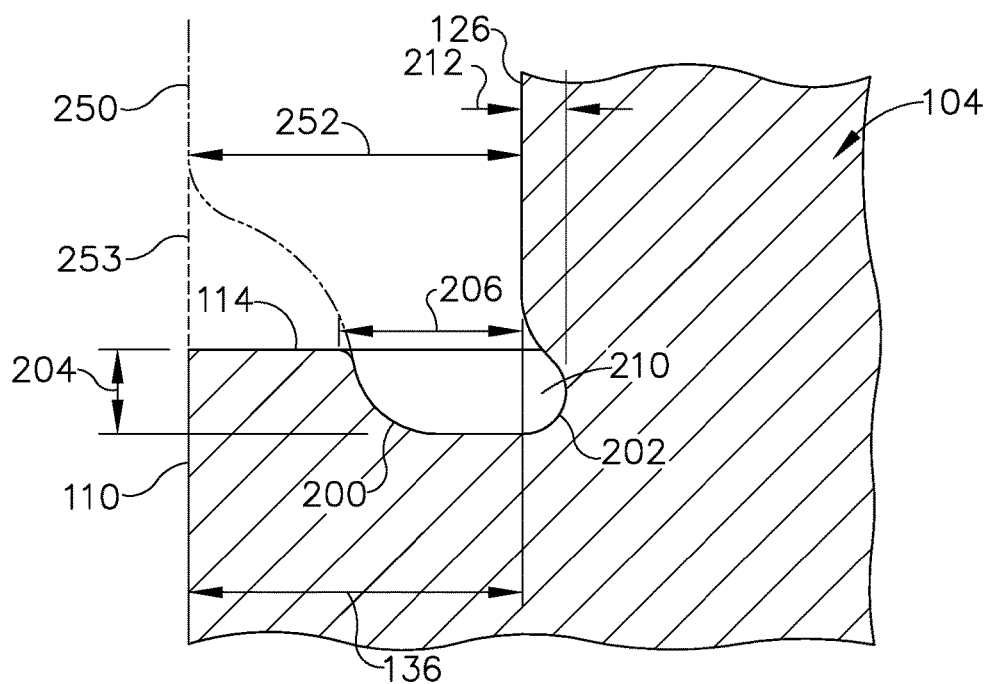
FIG. 8 is a side view of a portion of the airfoil in FIG. 7 taken along line 8-8.

In FIGS. 7 and 8, a portion of one of the airfoils 104 in the turbine assembly 99 from FIG. 2 is illustrated according to a second embodiment of the invention where the dimensions as described for the first embodiment also apply to the second embodiment. The trough 200 can contain a cove 210 located at least at the position of the leading edge 126 of the airfoil 104 as seen in FIG. 7. Exemplary air flows F are shown for air moving toward the leading edge 126 of the airfoil 104 and into the trough 200. The inner wall 202 of the trough 200 can be recessed by an amount 212 into the leading edge 126, forming the cove 210 as seen in FIG. 8. The cove 210 is tantamount to an undercut, nook, or cavity within the trough 200 at the leading edge 126. Further, the cove 210 may extend around the pressure side 122 and suction side 124 with a constant depth 204 and width 206, or it can also be contoured with varying depth 204 and width 206.

A method of reducing the upstream extent 252 of a bow wave 250 from an airfoil 104 comprises forming a vortex at a leading edge 126 of the airfoil 104 along at least a portion of the root 130 of the airfoil 104. The vortex can be of sufficient strength to limit the upstream extent 252 of the bow wave 250 to a distance less than or equal to the width 206 of the trough 200 for at least 15% of the span from the root 130 as shown in FIG. 5.

The introduction of the trough 200 at the root 130 of the airfoil 104 can act to suppress the broadcast of the bow wave 252; in one example the extent 252 of the bow wave 250 was reduced by 66% compared to a current design. Referring to FIG. 3, the gap 138 can be continually purged with cooling air to protect any temperature-sensitive materials positioned within the cavity below the gap 138. The bow wave broadcast reduction can allow for the spacing distance 116 to be reduced between each adjacent vane 72 and blade 68 while still preventing ingestion of the bow wave into the gap 138. It can be appreciated that a reduction in the spacing distance 116 can allow for a reduction in the axial length of the turbine assembly 99, which can reduce the overall engine length and weight, manufacturing costs, external drag on the engine, and the amount of material to cool within the engine, and also increase the engine's efficiency.

It should be appreciated that application of the disclosed design is not limited to turbine engines with fan and booster sections, but is applicable to turbojets and turboshaft engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent

What is claimed is:

1. An assembly for a turbine engine having a combustion section emanating a combustion airflow, comprising:
radially spaced inner and outer bands defining a flow path between the inner and outer bands, wherein the inner and outer bands each have an upstream edge, a downstream edge, and a surface extending between the upstream edge and the downstream edge;
an airfoil extending from one of the inner or outer bands into the flow path and defining a leading edge confronting the flow path, the airfoil having a pressure side and a suction side, and extending from the leading edge to a trailing edge to define a chord-wise direction, and extending from a root to a tip to define a span-wise direction, where the root is proximate one of the inner or outer bands and the tip is proximate the other of the inner or outer bands; and
an imperforate trough extending into the surface of one of the inner or outer bands along the leading edge;
whereby the imperforate trough generates a vortex in the combustion airflow.

2. The assembly of claim 1 wherein the imperforate trough generates a vortex that limits a bow wave generated by the leading edge to not extend upstream beyond the imperforate trough at up to 15% of the span from the root.

3. The assembly of claim 1 wherein the imperforate trough extends around the leading edge to at least a portion of the suction side and the pressure side.

4. The assembly of claim 1 wherein the airfoil is one of a vane or blade in one of a compressor or turbine.

5. The assembly of claim 1 wherein the imperforate trough generates a vortex that limits a bow wave generated by the leading edge to not extend upstream beyond the imperforate trough at a portion of the airfoil proximate the surface.

6. The assembly of claim 1 wherein the imperforate trough has a depth that is between 0.25 and 3.5 times a radius of the leading edge.

7. The assembly of claim 1 wherein the imperforate trough has a width that is between 0.25 and 3.5 times a radius of the leading edge.

8. The assembly of claim 1 wherein a distance from the upstream edge to leading edge is between 0.25 and 5.0 times a radius of the leading edge.

9. The assembly of claim 1 further comprising a flow enhancer located within the imperforate trough.

10. The assembly of claim 9 wherein the flow enhancer comprises at least one of a turbulator, fastback turbulator, pin fins, pin bank, vortex generator, or chevron.

11. The assembly of claim 1 further comprising a cove located at least along an intersection of the leading edge and the imperforate trough.

12. The assembly of claim 11 wherein the imperforate trough comprises an inner wall recessed into the leading edge to form the cove.

13. The assembly of claim 11 wherein the cove comprises a cavity within the imperforate trough at the leading edge.

14. The assembly of claim 11 wherein the cove extends around at least one of the pressure side or the suction side of the airfoil.

15. An assembly for a turbine engine having a combustion section emanating a combustion airflow, comprising:
at least one circumferential band at least partially defining an air flow path along which the combustion airflow moves and having an upstream edge and a downstream edge relative to the air flow path, with a surface extending between the upstream edge and the downstream edge;
a component extending from the at least one circumferential band into the airflow path and defining a leading edge confronting the air flow path;
an imperforate trough extending into the surface of the at least one circumferential band along the leading edge; and
a flow enhancer located within the imperforate trough, wherein the flow enhancer comprises at least one of a turbulator, fastback turbulator, pin fins, pin bank, vortex generator, or chevron;
whereby the imperforate trough generates a vortex in the combustion airflow.

16. The assembly of claim 15 wherein the component is one of a temperature probe, strut, nozzle, pyrometer, airfoil or other instrumentation probe.

17. The assembly of claim 16 wherein the component is an airfoil having a pressure side and a suction side, and extending from the leading edge to a trailing edge to define a chord-wise direction, and extending from a root to a tip to define a span-wise direction, with one of the root and the tip proximate the at least one circumferential band.

18. The assembly of claim 17 wherein the at least one circumferential band comprises radially spaced inner and outer bands defining a flow path between the inner and outer bands, wherein the inner bands and outer bands each have an upstream edge, a downstream edge, and a surface extending between the upstream edge and the downstream edge, and the root is proximate one of the inner or outer bands and the tip is proximate the other of the inner or outer bands.

19. An assembly for a turbine engine having a combustion section emanating a combustion airflow, comprising:
at least one circumferential band at least partially defining an air flow path along which the combustion airflow moves and having an upstream edge and a downstream edge relative to the air flow path, with a surface extending between the upstream edge and the downstream edge;
a component extending from the at least one circumferential band into the air flow path and defining a leading edge confronting the air flow path; and
an imperforate trough extending into the surface of the at least one circumferential band along the leading edge; and
a cove located at least along an intersection of the leading edge and the imperforate trough;
whereby the imperforate trough generates a vortex in the combustion airflow.

20. The assembly of claim 19 wherein the imperforate trough comprises an inner wall recessed into the leading edge to form the cove.

21. The assembly of claim 19 wherein the cove comprises a cavity within the imperforate trough at the leading edge.

22. The assembly of claim 19 wherein the cove extends around at least one of a pressure side or a suction side of the component.

23. The assembly of claim 19 further comprising a flow enhancer located within the imperforate trough or the cove.

24. The assembly of claim 23 wherein the flow enhancer comprises at least one of a turbulator, fastback turbulator, pin fins, pin bank, vortex generator, or chevron.

* * * * *